(12) United States Patent
Yang et al.

(10) Patent No.: US 8,685,361 B2
(45) Date of Patent: Apr. 1, 2014

(54) METHOD FOR PREPARING POLYACRYLONITRILE-BASED POLYMER FOR PREPARATION OF CARBON FIBER USING MICROWAVE AND METHOD FOR PREPARING CARBON FIBER USING THE SAME

(75) Inventors: Kap-Seung Yang, Gwangju (KR); Sung-Ho Lee, Jeonbuk (KR); Hyang-Hoon Chae, Gwangju (KR); Dong-Hun Lee, Gwangju (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/461,241

(22) Filed: May 1, 2012

(65) Prior Publication Data
US 2012/0288434 A1    Nov. 15, 2012

(30) Foreign Application Priority Data

May 11, 2011  (KR) .................. 10-2011-0044192

(51) Int. Cl.
*D01F 9/12*    (2006.01)

(52) U.S. Cl.
USPC .............. 423/447.1; 524/379; 564/341

(58) Field of Classification Search
USPC .......... 423/447.8, 447.1, 447.3; 977/742; 524/284, 379; 561/341–343
See application file for complete search history.

(56) References Cited

U.S. PATENT DOCUMENTS

| 4,921,656 | A | 5/1990 | Daumit et al. | |
| 2011/0160369 | A1* | 6/2011 | Way et al. | 524/284 |

FOREIGN PATENT DOCUMENTS

KR    1020050100635 A    10/2005

OTHER PUBLICATIONS

Hou, C. et al. "ATRP of Acrylonitrile Catalyzed By FeCl2/Succinic Acid Under Microwave Irradiation". Journal of Applied Polymer Science, vol. 101, 1598-1601 (2006).*
M.C Paiva, P Kotasthane, D.D Edie, A.A Ogale, UV stabilization route for melt-processible PAN-based carbon fibers, Carbon, vol. 41, Issue 7, 2003, pp. 1399-1409, ISSN 0008-6223, 10.1016/S0008-6223(03)00041-1. (http://www.sciencedirect.com/science/article/pii/S0008622303000411).*
D.D. Edie, M.G. Dunham, Melt spinning pitch-based carbon fibers, Carbon, vol. 27, Issue 5, 1989, pp. 647-655, ISSN 0008-6223, 10.1016/0008-6223(89)90198-X. (http://www.sciencedirect.com/science/article/pii/000862238990198X).*
Trinath Biswal, et al; "Complex-mediated microwave-assisted synthesis of polyacrylonitrile nanoparticles", Nanotechnology, Science and Applications, Oct. 2010, vol. 2010, pp. 77-83.

* cited by examiner

*Primary Examiner* — Stanley Silverman
*Assistant Examiner* — Richard M Rump
(74) *Attorney, Agent, or Firm* — Ladas & Parry LLP

(57)    ABSTRACT

Disclosed therein is a method for preparing a polyacrylonitrile-based polymer for preparation of carbon fiber having a melting point controlled by selecting an optimal energy of microwave, and a method for preparing a carbon fiber through melt spinning using the preparation method for polyacrylonitrile-based polymer. The present invention uses microwave to control the properties of the polyacrylonitrile-based polymer in a simplified way and prepare the polymer optimized for preparation of carbon fiber precursor through melt spinning for a short polymerization time, and provides a means for mass production of the polyacrylonitrile-based polymer being suitable for melt spinning at a temperature lower than the stabilization temperature and acquiring properties adequate to preparation of carbon fiber through stabilization. Hence, the present invention is expected to contribute to mass production of high-performance carbon fibers at reduced cost.

8 Claims, 7 Drawing Sheets

METHOD FOR PREPARING POLYACRYLONITRILE-BASED POLYMER FOR PREPARATION OF CARBON FIBER USING MICROWAVE AND METHOD FOR PREPARING CARBON FIBER USING THE SAME

CROSS-REFERENCE TO RELATED APPLICATION

This application claims under 35 U.S.C. §119(a) priority to and the benefit of Korean Patent Application No. 10-2011-0044192, filed on May 11, 2011, the entire contents of which are incorporated herein by reference.

BACKGROUND OF THE INVENTION (a) Field of the Invention

The present invention relates to a method for preparing polyacrylonitrile-based polymer using microwave and melt-spinning it to prepare carbon fibers.

(b) Description of the Related Art

Carbon fiber, lighter but stronger than steel, has been widely used in a variety of applications, such as automobile, aircrafts, aerospace, sports, and so forth.

For example, as the recent environmental concerns have led to tightened restrictions on vehicle emissions and an increase in demand for high fuel efficiency, light-weighted vehicles, the technique of using carbon fiber reinforced composites is noted as a solution to reduce the weight of vehicles at no expense for structural and mechanical strengths.

Carbon fiber is, however, far too expensive for its applications and commercialization, so there has been a pressing need for developing techniques for mass production of high-performance carbon fibers at low cost.

Based on precursor fiber materials, the carbon fiber is classified into polyacrylonitrile-based carbon fiber, rayon-based carbon fiber, and pitch-based carbon fiber.

The techniques of preparing precursor fibers for carbon fiber are wet spinning, dry spinning, and melt spinning, among which the melt spinning technique is a fast spinning method requiring relatively simple facility and low cost without a need for collecting a solvent or a solidified solution.

To prepare precursor fibers using the melt spinning technique, the polyacrylonitrile-based polymer is required to have thermoplasticity and a melting point for spinning lower than the stabilization temperature. For enhanced efficiency of the preparation process for carbon fibers, there has been suggested a method of reducing the production time of polyacrylonitrile-based polymers using a plurality of polymerization reactors connected to one another in series or parallel, which problematically increases the yield of byproducts and degradation products to deteriorate the whole production efficiency.

Hence, there is a pressing demand for developing a technique to prepare polyacrylonitrile-based polymers having properties adequate to preparation of carbon fibers using a simplified method at low cost.

SUMMARY OF THE INVENTION

Accordingly, it is an object of the present invention to provide a method for preparing a polyacrylonitrile-based polymer using a selected energy of microwave at a high energy yield for a short polymerization time, where the polyacrylonitrile-based polymer thus prepared has properties adequate to preparation of carbon fibers and is suitable for melt spinning due to its thermoplasticity at a stabilization temperature or below.

It is another object of the present invention to provide a method for preparing a polyacrylonitrile-based carbon fiber using the method.

The present invention provides a method for preparing a polyacrylonitrile-based polymer for preparation of carbon fiber that comprises irradiating microwave on a composition comprising an acrylonitrile monomer to cause a polymerization of the monomer.

The polymerization step is conducted by irradiating 50 to 300 watt microwave on the composition for 1 to 120 minutes.

The polyacrylonitrile-based polymer prepared by the above method has a melting point of 180 to 220° C. lower than the stabilization temperature of about 280° C.

The polyacrylonitrile-based polymer has a weight average molecular weight of 20,000 to 100,000.

The composition comprises acrylonitrile, a co-monomer, an initiator, and a solvent.

The co-monomer comprises at least one compound selected from the group consisting of methylacrylate, methylmethacrylate, acrylic acid, methacrylic acid, and itaconic acid.

Furthermore, the composition comprises a monomer compound comprising 85 to 99 wt. % of acrylonitrile and 1 to 15 wt. % of the co-monomer; and, with respect to 100 parts by weight of the monomer compound, 0.01 to 5 parts by weight of the initiator, and 100 to 600 parts by weight of the solvent.

The present invention also provides a method for preparing a polyacrylonitrile-based carbon fiber that comprises: irradiating microwave on a composition comprising an acrylonitrile monomer to prepare a polyacrylonitrile-based polymer; melt-spinning the polyacrylonitrile-based polymer to prepare a precursor fiber; and stabilizing and carbonating the precursor fiber.

The melt-spun precursor fiber has an average diameter of 10 to 250 µm.

The stabilization of the precursor fiber is conducted by heating the precursor fiber at a heating rate of 0.1 to 5° C./min to perform heat treatment at 200 to 350° C. for 30 to 240 minutes and then air-cooling.

The carbonation of the precursor fiber is conducted by heating the precursor fiber at a heating rate of 0.1 to 10° C./min to perform heat treatment at 600 to 1500° C. for 30 to 240 minutes and then air-cooling.

The carbon fiber has an average diameter of 5 to 200 µm.

The present invention uses a selected energy of microwave to control the properties of polyacrylonitrile-based polymer in a simplified way and prepare the polymer for a short polymerization time, and provides a means for mass production of a polyacrylonitrile-based polymer having a melting point lower than the stabilization temperature to be suitable for melt spinning and possessing properties adequate to preparation of carbon fiber. Hence, the present invention offers a promising means for mass production of high-performance carbon fibers at reduced cost.

DETAILED DESCRIPTION OF THE PREFERRED EMBODIMENT

Hereinafter, a detailed description will be given as to a method for preparing a polyacrylonitrile-based polymer and a method for preparing a carbon fiber using the same according to the invention.

In accordance with one embodiment of the present invention, there is provided a method for preparing a polyacrylonitrile-based polymer for preparation of carbon fiber that includes irradiating microwave on a composition comprising an acrylonitrile monomer to cause a polymerization of the monomer.

The use of optimized microwave in preparation of a polyacrylonitrile-based polymer according to the present invention makes it possible to control the properties of the polymer in a simplified way and to prepare a proper polymer effectively for a short polymerization time. The present invention can also prepare with ease a polymer having a melting point lower than the stabilization temperature to be suitable for melt spinning and acquiring properties adequate to preparation of carbon fibers through stabilization subsequent to spinning, thereby providing a means for mass production of high-performance carbon fibers at low cost.

Figure 1:
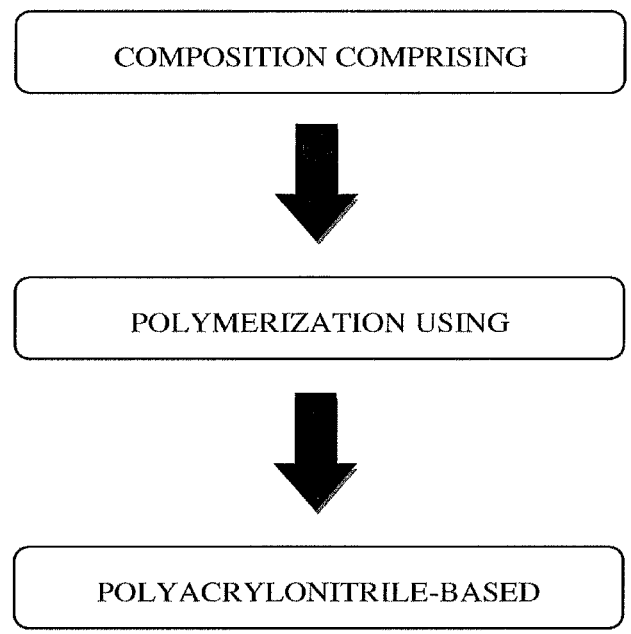
FIG. 1 is a schematic flow chart showing a method for preparing a polyacrylonitrile-based polymer according to one embodiment of the present invention.

FIG. 1 is a schematic flow chart showing a method for preparing a polyacrylonitrile-based polymer according to one embodiment of the present invention, which features irradiating microwave on a composition comprising an acrylonitrile monomer to polymer the monomer.

The preparation method of the present invention involves controlling the energy intensity (output power) of microwave and the energy irradiation time to prepare a polyacrylonitrile-based polymer having desired properties for a short reaction time.

According to the present invention, the polymerization step may be conducted by exposing a composition comprising the acrylonitrile monomer to 50 to 300 watt microwave for 1 to 120 minutes; preferably 50 to 200 watt microwave for 1 to 90 minutes; more preferably 50 to 150 watt microwave for 1 to 60 minutes.

The energy intensity and the energy irradiation time of microwave are controlled in consideration of the quantity of the composition, the desired properties of the polymer, the volume of preparation facility, or the like, and may be changed other than the above-defined ranges.

The composition may comprise, as well as acrylonitrile, a co-monomer, an initiator, and a solvent.

The co-monomer lowers the stabilization temperature for the precursor fiber and the heat flux to prevent the cut-off of the fiber, and preferably includes at least one compound selected from the group consisting of methacrylate, methylmethacrylate, acrylic acid, methacrylic acid, and itaconic acid.

The composition may comprise a monomer compound comprising 85 to 99 wt. % of acrylonitrile and 1 to 15 wt. % of a co-monomer; and, with respect to 100 parts by weight of the monomer compound, 0.01 to 5 parts by weight of the initiator, and 100 to 600 parts by weight of the solvent.

In consideration of molecular weight, melting point, or the like, the co-monomer may be contained in an amount of 1 to 15 wt. %, preferably 1 to 10 wt. % with respect to the total weight of the monomer compound.

The initiator is not specifically limited and may include any compound that is activated by microwave to initiate the polymerization of the composition. The content of the initiator may be controlled in the range of 0.01 to 5 parts by weight, preferably 0.1 to 3 parts by weight with respect to 100 parts by weight of the monomer compound in order to cause a minimum degree of polymerization and prevent the residue from deteriorating the properties of the precursor fiber.

The solvent is not specifically limited and may include any solvent that forms a system supporting the polymerization reaction of the monomer compound. Preferably, the solvent may be dimethylsulfoxide, dimethylacetamide, dimethylformamide, or a mixture containing at least two of these.

The content of the solvent may be controlled in the range of 100 to 600 parts by weight, preferably 200 to 500 parts by weight with respect to 100 parts by weight of the monomer compound in consideration of the efficiency of the polymerization reaction, or the like.

The polyacrylonitrile-based polymer prepared by the above-described method is suitable for melt spinning due to its thermoplasticity and has properties adequate to preparation of carbon fibers.

In other words, the polyacrylonitrile-based polymer prepared by the above method may have a melting point of 180 to 220° C., preferably 190 to 210° C.

The polyacrylonitrile-based polymer prepared by the above method may also have a weight average molecular weight of 20,000 to 100,000, preferably 30,000 to 80,000.

The melting point and the weight average molecular weight of the polyacrylonitrile-based polymer may be determined depending on the composition of the monomer compound, the constitutional composition of the whole composition, and the polymerization conditions. Hence, the preparation method of the present invention may also prepare polymers having properties in other ranges than defined above.

In accordance with another embodiment of the present invention, there is provided a method for preparing a polyacrylonitrile-based carbon fiber that comprises: irradiating microwave on a composition comprising an acrylonitrile monomer to prepare a polyacrylonitrile-based polymer; melt-spinning the polyacrylonitrile-based polymer to prepare a precursor fiber; and stabilizing and carbonating the precursor fiber.

Figure 2:
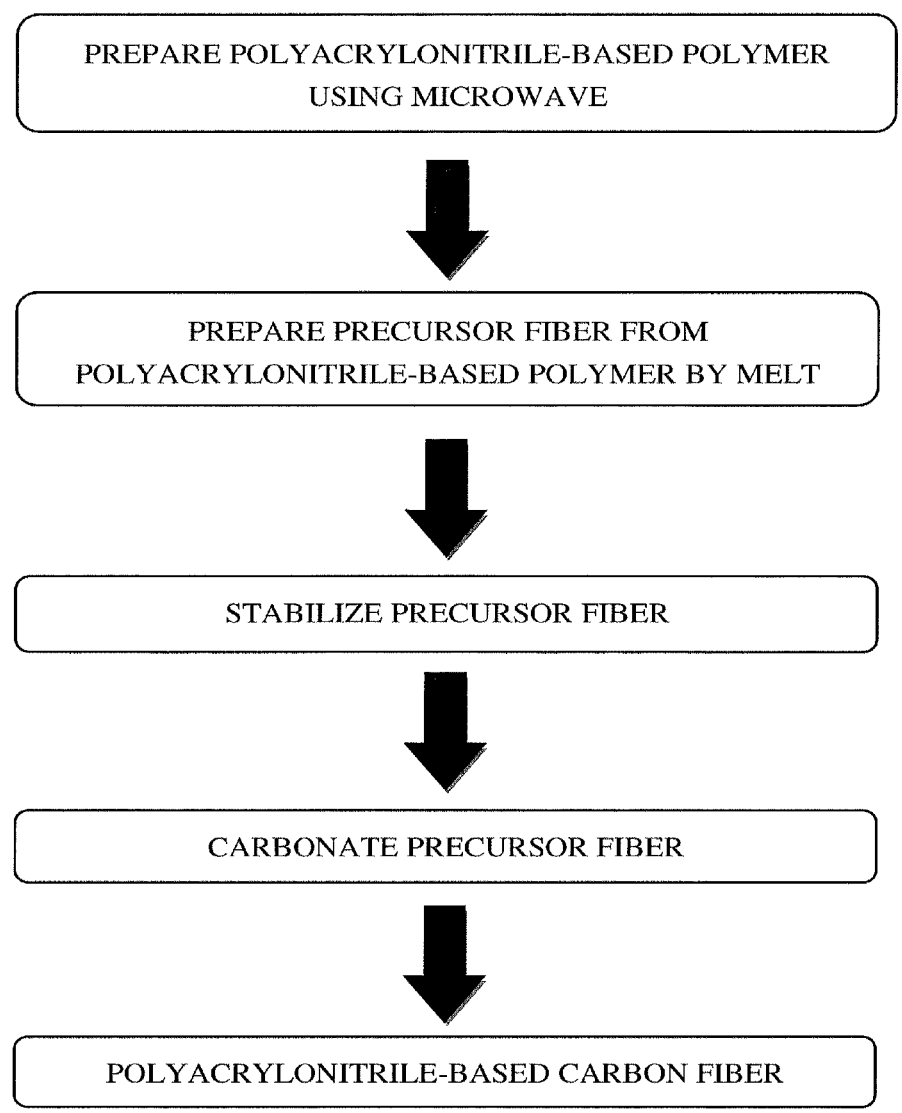
FIG. 2 is a schematic flow chart showing a method for preparing a polyacrylonitrile-based carbon fiber according to one embodiment of the present invention.
Figure 3:
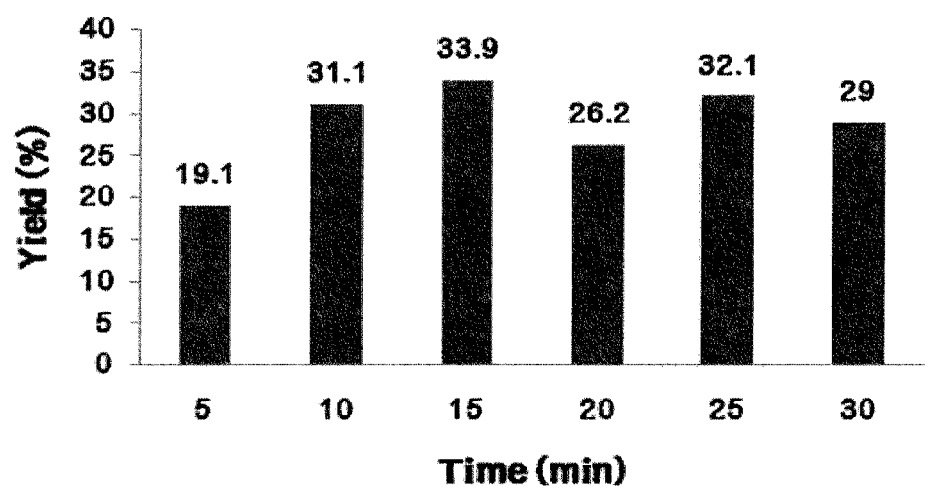
FIG. 3 is a graph showing polymer yield versus polymerization time in the preparation method of polymer according to the examples of the present invention.

FIG. 2 is a schematic flow chart showing the method for preparing a polyacrylonitrile-based carbon fiber according to the embodiment of the present invention, which will be referred to describe the present invention as follows.

First, the preparation method for carbon fiber according to the present invention includes a step of irradiating microwave on a composition comprising an acrylonitrile monomer to prepare a polyacrylonitrile-based polymer.

The use of microwave in the step of preparing the polyacrylonitrile-based polymer makes it possible to control the properties of the polymer in a simplified way and to effectively prepare the polymer for a short polymerization time.

The step offers a means for easily preparing a polyacrylonitrile-based polymer that is suitable for melt spinning due to its high crystallinity and melting point of 180 to 220° C. and has properties adequate to preparation of carbon fibers, including a weight average molecular weight of 20,000 to 100,000. The detailed description is already given above and will be omitted.

The preparation method for carbon fibers according to the present invention includes a subsequent step of melt-spinning the polyacrylonitrile-based polymer to prepare a precursor fiber.

The step of preparing the precursor fiber may be conducted under general spinning conditions with a spinning device known to those skilled in the art, and the spinning device and the spinning conditions are not specifically limited.

According to the present invention, the polymer melt obtained by melting the polyacrylonitrile-based polymer is spun through a spinning nozzle of a spinning device, stretched to approximately 4 to 5 times the length and then wound to form a precursor fiber.

Particularly, the maximum temperature in the melt spinning step is preferably determined in consideration of the melting point range of the polyacrylonitrile-based polymer.

The precursor fiber thus prepared may have an average diameter of 10 to 250 μm, preferably 10 to 150 μm, more preferably 10 to 50 μm in consideration of the properties of the precursor fiber, the diameter of the final carbon fiber, and so forth.

Subsequent to the melt spinning step, the preparation method for carbon fibers according to the present invention goes to a step of stabilizing and carbonating the precursor fiber.

The stabilization and carbonation step is stabilizing the precursor fiber by way of heat treatment to induce a cyclization reaction as presented by the following reaction scheme 1 and finally form a carbon fiber.

[Scheme 1]

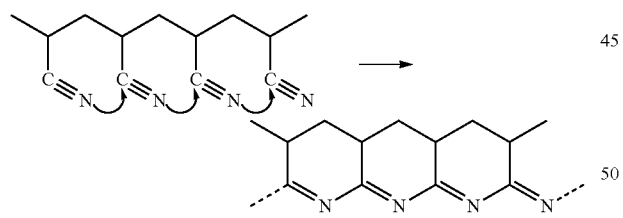

To stabilize the precursor fiber, the precursor fiber is heated at a heating rate of 0.1 to 5° C./min and heat-treated at 200 to 350° C. for 30 to 240 minutes; preferably heated at a heating rate of 0.1 to 5° C./min, heat-treated at 250 to 300° C. for 30 to 120 minutes and then air-cooled.

To carbonate the stabilized precursor fiber, the precursor fiber is heated at a heating rate of 0.1 to 10° C./min and heat-treated at 600 to 1500° C. for 30 to 240 minutes; preferably heated at a heating rate of 0.1 to 10° C./min, heat-treated at 600 to 1500° C. for 30 to 120 minutes and then air-cooled.

The average diameter of the carbon fiber thus prepared is reduced through the stabilization and carbonation process, and may be in the range of 5 to 200 μm, preferably 5 to 100 μm, more preferably 7 to 30 μm, most preferably 7 to 10 μm in consideration of the mechanical properties of the carbon fiber, or the like.

The average diameter of the carbon fiber is not specifically limited to the above-defined range and may be changed depending on the properties of the polymer and the precursor fiber, the conditions for stabilization and carbonation of the precursor fiber, and so forth.

The preparation method for carbon fiber according to the present invention includes, if not specifically limited to, the above-mentioned steps and may further include any other steps known to those skilled in the art before or after the above-mentioned steps.

The carbon fiber thus prepared is a promising material useful in various fields of composite materials, such as for light-weight automobiles, wind energy generators, electrical conductors, aircrafts & aerospace, and so forth.

Hereinafter, preferred examples are provided for helping the better understanding of the present invention, which examples are only exemplify the present invention and not intended to limit the scope of the present invention.

Example 1-1

Preparation of Polyacrylonitrile-Based Polymer Using Microwave

Monomer compounds, acrylonitrile (AN, Aldrich Chemical Co.) and methylacrylate (MA, Aldrich Chemical Co.), were mixed at a mixing ratio of about 90:10.

To the mixture of the monomer compounds were added, with respect to 100 parts by weight of the monomer compounds, about 0.1 part by weight of 2,2'-azobisisobutyronitrile (AIBN, Aldrich Chemical Co.) as an initiator and about 200 parts by weight of dimethyl sulfoxide (DMSO, Yakuri Pure Chemical Co.) as a solvent.

The composition thus prepared was put in an airtight container, which was then put in a microwave device (KR-A202B, Daewoo Electronics) and exposed to 100 watt microwave for 30 minutes to cause a polymerization reaction.

The polymer thus obtained was washed with methanol and then dried out in a vacuum oven to obtain a polyacrylonitrile-based polymer (yield: about 29%, weight average molecular weight: about 80,000)

Example 1-2

Preparation of Polyacrylonitrile-Based Polymer Using Microwave

Monomer compounds, acrylonitrile (AN, Aldrich Chemical Co.) and methylacrylate (MA, Aldrich Chemical Co.), were mixed at a mixing ratio of about 90:10.

To the mixture of the monomer compounds were added, with respect to 100 parts by weight of the monomer compounds, about 0.1 part by weight of 2,2'-azobisisobutyronitrile (AIBN, Aldrich Chemical Co.) as an initiator and about 200 parts by weight of dimethyl sulfoxide (DMSO, Yakuri Pure Chemical Co.) as a solvent.

The composition thus prepared was put in an airtight container, which was then put in a microwave device (KR-A202B, Daewoo Electronics) and exposed to 100 watt microwave for 25 minutes to cause a polymerization reaction.

The polymer thus obtained was washed with methanol and then dried out in a vacuum oven to obtain a polyacrylonitrile-based polymer (yield: about 32.1%, weight average molecular weight: about 80,000)

Example 1-3

Preparation of Polyacrylonitrile-Based Polymer Using Microwave

Monomer compounds, acrylonitrile (AN, Aldrich Chemical Co.) and methylacrylate (MA, Aldrich Chemical Co.), were mixed at a mixing ratio of about 90:10.

To the mixture of the monomer compounds were added, with respect to 100 parts by weight of the monomer compounds, about 1 part by weight of 2,2'-azobisisobutyronitrile (AIBN, Aldrich Chemical Co.) as an initiator and about 300 parts by weight of dimethyl sulfoxide (DMSO, Yakuri Pure Chemical Co.) as a solvent.

The composition thus prepared was put in an airtight container, which was then put in a microwave device (KR-A202B, Daewoo Electronics) and exposed to 100 watt microwave for 20 minutes to cause a polymerization reaction. The polymer thus obtained was washed with methanol and then dried out in a vacuum oven to obtain a polyacrylonitrile-based polymer (yield: about 26.2%, weight average molecular weight: about 73,000)

Example 1-4

Preparation of Polyacrylonitrile-Based Polymer Using Microwave

Monomer compounds, acrylonitrile (AN, Aldrich Chemical Co.) and methylacrylate (MA, Aldrich Chemical Co.), were mixed at a mixing ratio of about 90:10.

To the mixture of the monomer compounds were added, with respect to 100 parts by weight of the monomer compounds, about 1 part by weight of 2,2'-azobisisobutyronitrile (AIBN, Aldrich Chemical Co.) as an initiator and about 300 parts by weight of dimethyl sulfoxide (DMSO, Yakuri Pure Chemical Co.) as a solvent.

The composition thus prepared was put in an airtight container, which was then put in a microwave device (KR-A202B, Daewoo Electronics) and exposed to 100 watt microwave for 15 minutes to cause a polymerization reaction.

The polymer thus obtained was washed with methanol and then dried out in a vacuum oven to obtain a polyacrylonitrile-based polymer (yield: about 33.9%, weight average molecular weight: about 65,000)

Example 1-5

Preparation of Polyacrylonitrile-Based Polymer Using Microwave

Monomer compounds, acrylonitrile (AN, Aldrich Chemical Co.) and methylacrylate (MA, Aldrich Chemical Co.), were mixed at a mixing ratio of about 90:10.

To the mixture of the monomer compounds were added, with respect to 100 parts by weight of the monomer compounds, about 1 part by weight of 2,2'-azobisisobutyronitrile (AIBN, Aldrich Chemical Co.) as an initiator and about 300 parts by weight of dimethyl sulfoxide (DMSO, Yakuri Pure Chemical Co.) as a solvent.

The composition thus prepared was put in an airtight container, which was then put in a microwave device (KR-A202B, Daewoo Electronics) and exposed to 100 watt microwave for 10 minutes to cause a polymerization reaction.

The polymer thus obtained was washed with methanol and then dried out in a vacuum oven to obtain a polyacrylonitrile-based polymer (yield: about 31.1%, weight average molecular weight: about 50,000)

Example 1-6

Preparation of Polyacrylonitrile-Based Polymer Using Microwave

Monomer compounds, acrylonitrile (AN, Aldrich Chemical Co.) an methylacrylate (MA, Aldrich Chemical Co.), were mixed at a mixing ratio of about 90:10.

To the mixture of the monomer compounds were added, with respect to 100 parts by weight of the monomer compounds, about 1 part by weight of 2,2'-azobisisobutyronitrile (AIBN, Aldrich Chemical Co.) as an initiator and about 300 parts by weight of dimethyl sulfoxide (DMSO, Yakuri Pure Chemical Co.) as a solvent.

The composition thus prepared was put in an airtight container, which was then put in a microwave device (KR-A202B, Daewoo Electronics) and exposed to 100 watt microwave for 5 minutes to cause a polymerization reaction.

The polymer thus obtained was washed with methanol and then dried out in a vacuum oven to obtain a polyacrylonitrile-based polymer (yield: about 19.1%, weight average molecular weight: about 30,000)

Experimental Example 1

The polyacrylonitrile-based polymer of Example 1-1 was heated up to 400° C. at a heating rate of 5° C./min in the nitrogen atmosphere to conduct a differential scanning calorimetry (DSC) analysis. The results are presented in FIG. 4.

Figure 4:
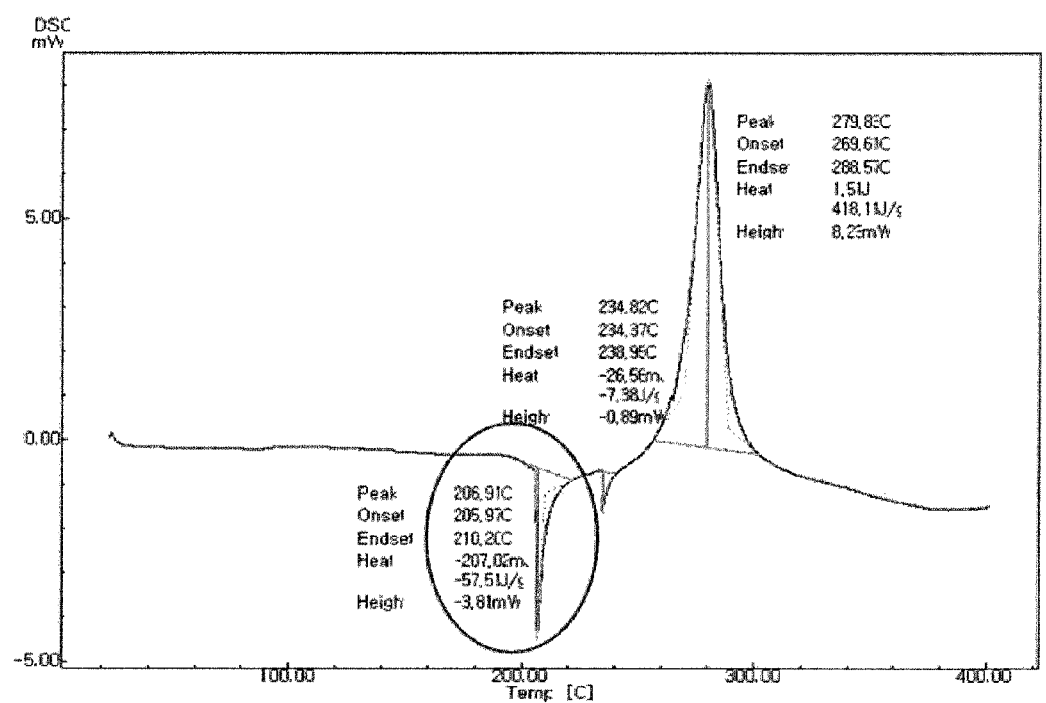
FIG. 4 is a DSC (Differential Scanning Calorimetry) graph for a polymer prepared according to one example of the present invention.

As can be seen from FIG. 4, the polymers melted at two temperatures around 200° C., and the exothermic reaction took place at around 289° C. An endothermic transition occurred at about 206° C., that is, a melting point at which the polymers melted. On the other hand, an exothermic transition took place at about 298° C., that is, a stabilization temperature at which the polymers began dehydrogenation and cyclization reactions.

With reference to these results, the melting temperature during the melt spinning step, which is conducted under pressure, may be actually lower than the melting point determined by the DSC analysis. Hence, the melt spinning was conducted at a temperature of about 190° C.

Example 2-1

Preparation of Precursor Fiber

In the nitrogen atmosphere (about 5 to 6 kgf/cm$^3$), the polyacrylonitrile-based polymer of Example 1-1 was heated from the room temperature to 190° C. at a heating rate of 5° C./min and melt at the maintained temperature of 190° C. for 30 minutes.

Subsequently, the polymer melt was spun with a spinning device (DAQSTATION DX1000, YOKOGAWA) and stretched about 5 times the length to prepare a precursor fiber (average diameter: about 190 μm).

Figure 5:
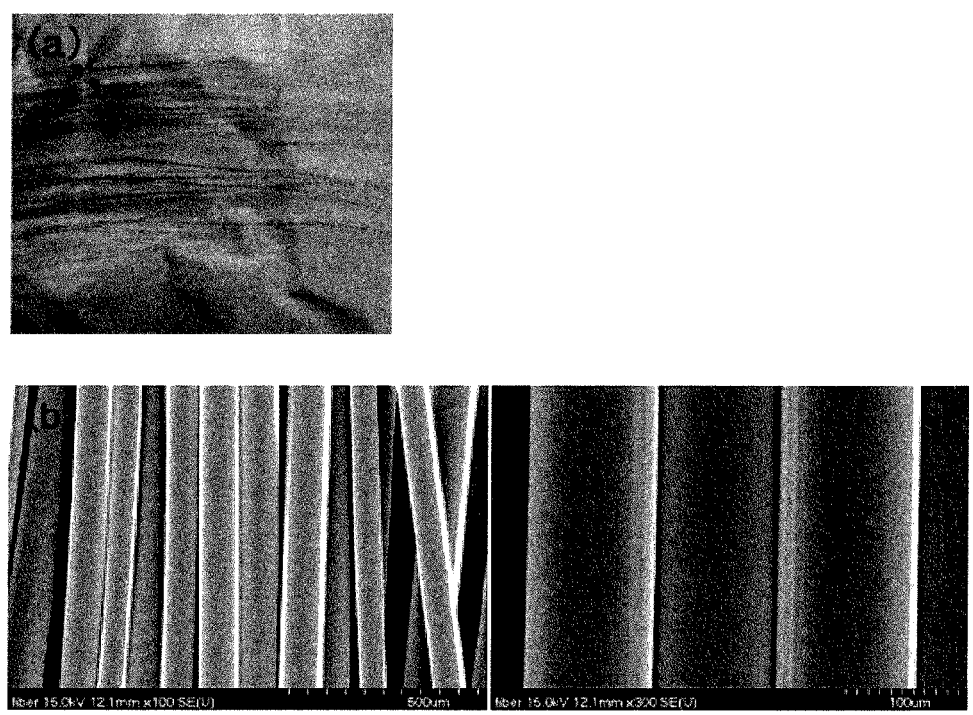
FIG. 5 shows a picture (a) of a precursor fiber melt-spun according to one example of the present invention, and an enlarged SEM (Scanning Electron Microscopy) picture (b) of the precursor fiber.

The precursor fiber thus obtained had an even surface with soft texture. FIG. 5 shows a regular picture of the precursor fiber in (*a*) and an SEM picture in (*b*).

<Stabilization of Precursor Fiber>

While supplied with a compressed air at a rate of 5 to 20 ml/min using an air blast furnace, the precursor fiber was heated to 280° C. at a heating rate of 1° C./min, kept at 280° C. for 60 minutes for heat treatment, and then air-cooled down to the room temperature.

Figure 6:
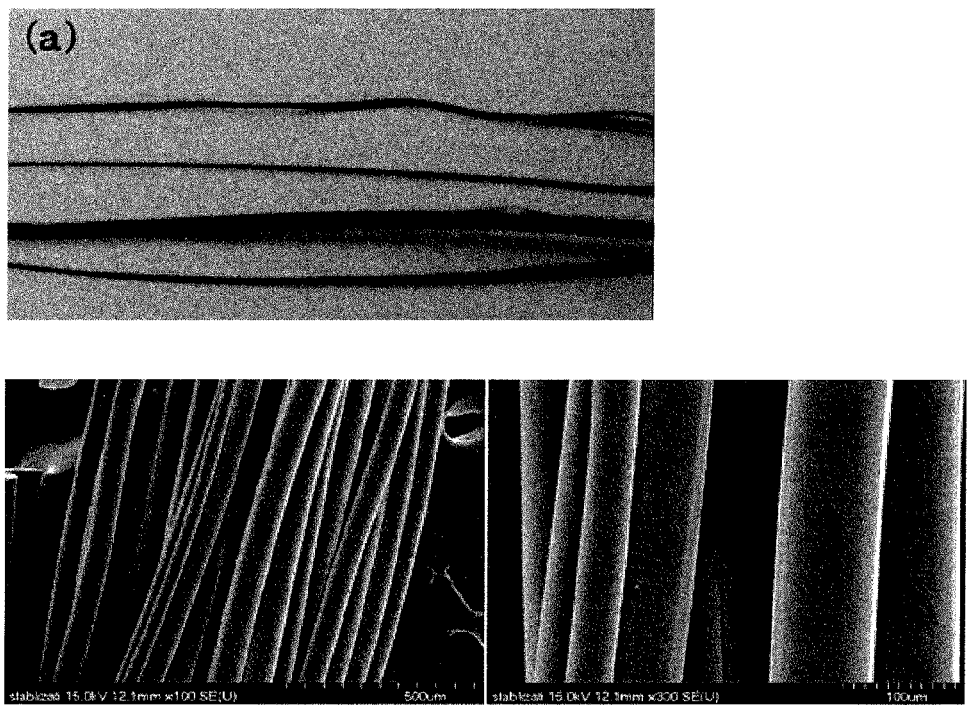
FIG. 6 shows a picture (a) of a precursor fiber stabilized according to one example of the present invention, and an enlarged SEM picture (b) of the precursor fiber.

FIG. 6 shows a regular picture of the stabilized precursor fiber in (*a*) and an SEM picture in (*b*). As can be seen from FIG. 6, the precursor fiber had an average diameter reduced to about 145 μm through the stabilization process.

<Carbonation of Precursor Fiber>

In a tube furnace, the stabilized precursor fiber was heated to 800° C. at a heating rate of 5° C./min, kept at the maintained temperature of 800° C. for 60 minutes for carbonation, and then air-cooled down to the room temperature.

Figure 7:
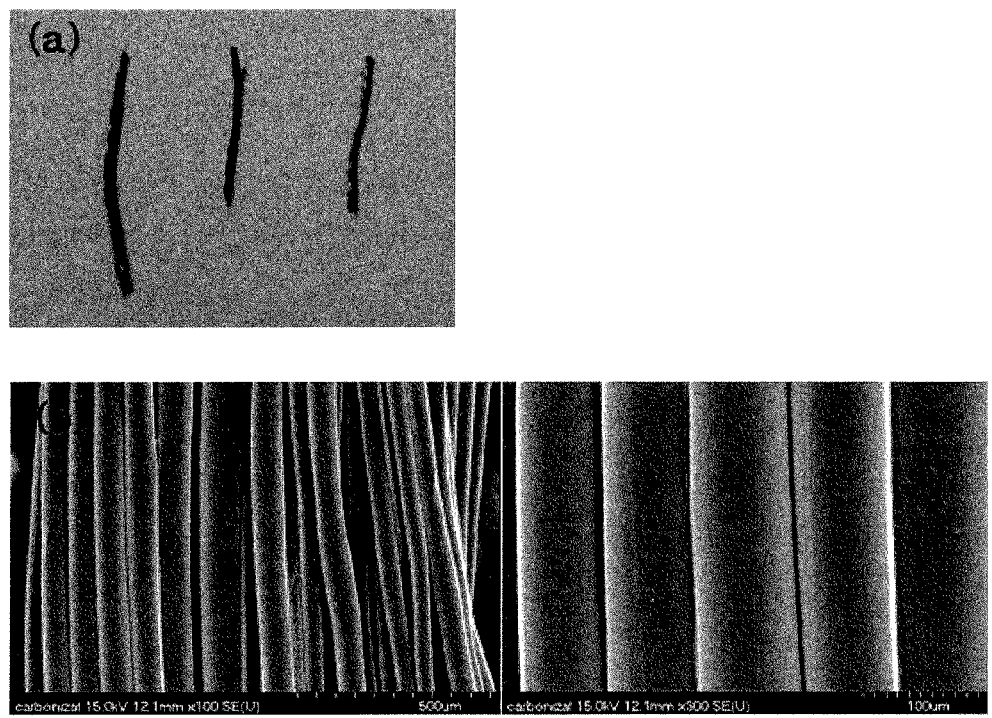
FIG. 7 shows a picture (a) of a carbon fiber obtained after carbonation according to one example of the present invention, and an enlarged SEM picture (b) of the carbon fiber.

FIG. 7 shows a regular picture of the resultant carbon fiber in (*a*) and an SEM picture in (*b*). As can be seen from FIG. 7, the carbon fiber had an average diameter reduced to about 135 μm through the carbonation process.

Examples 2-2 to 2-6

The procedures were performed in the same manner as described in Example 2-1 to prepare carbon fibers, excepting that polyacrylonitrile-based polymer of Examples 1-2 to 1-6 were used, respectively.

What is claimed is:

1. A method for preparing a polyacrylonitrile-based polymer, comprising:
    mixing monomer compounds acrylnitrile and methylacrylate at a mixing ratio of 90:10;
    preparing a composition by adding to the monomer compounds 0.1 part by weight of 2,2-azobisisobutyronitrile as an initiator and 200 parts by weight of dimethyl sulfoxide as a solvent with respect to 100 parts by weight of the monomer compounds;
    putting the composition in an airtight container;
    exposing the airtight container to 100 watt microwave for 30 minutes to obtain a polymer;
    washing the polymer with methanol;
    drying the polymer in a vacuum oven.

2. The method as claimed in claim 1, wherein the polyacrylonitrile-based polymer has a melting point of 180 to 220° C.

3. The method as claimed in claim 1, wherein the polyacrylonitrile-based polymer has a weight average molecular weight of 20,000 to 100,000.

4. A method for preparing a polyacrylonitrile-based carbon fiber, comprising:
    mixing monomer compounds acrylnitrile and methylacrylate at a mixing ratio of 90:10;
    preparing a composition by adding to the monomer compounds 0.1 part by weight of 2,2-azobisisobutyronitrile as an initiator and 200 parts by weight of dimethyl sulfoxide as a solvent with respect to 100 parts by weight of the monomer compounds;
    putting the composition in an airtight container;
    exposing the airtight container to 100 watt microwave for 30 minutes to obtain a polymer;
    washing the polymer with methanol;
    drying the polymer in a vacuum oven;
    melt-spinning the polyacrylonitrile-based polymer to prepare a precursor fiber; and
    stabilizing and carbonating the precursor fiber.

5. The method as claimed in claim 4, wherein the melt-spun precursor fiber has an average diameter of 10 to 250 μm.

6. The method as claimed in claim 4, the stabilization of the precursor fiber is conducted by heating the precursor fiber at a heating rate of 0.1 to 5° C./min to perform heat treatment at 200 to 350° C. for 30 to 240 minutes and then air-cooling.

7. The method as claimed in claim 4, wherein the carbonation of the precursor fiber is conducted by heating the precursor fiber at a heating rate of 0.1 to 10° C./min to perform heat treatment at 600 to 1500° C. for 30 to 240 minutes and then air-cooling.

8. The method as claimed in claim 4, wherein the carbon fiber has an average diameter of 5 to 200 μm.

* * * * *